United States Patent [19]

Hamada et al.

[11] Patent Number: 4,617,231

[45] Date of Patent: Oct. 14, 1986

[54] ELECTROCONDUCTIVE FILM AND PROCESS FOR PRODUCTION THEREOF

[75] Inventors: Akira Hamada; Hisao Takahashi; Keiichi Ohira, all of Iwaki, Japan

[73] Assignee: Kureha Kagaku Kogyo Kabushiki Kaisha, Tokyo, Japan

[21] Appl. No.: 796,443

[22] Filed: Nov. 8, 1985

[30] Foreign Application Priority Data

Nov. 12, 1984 [JP] Japan .................................. 59-236772

[51] Int. Cl.⁴ .............................................. B32B 5/06
[52] U.S. Cl. .................................... 428/297; 427/180;
427/365; 427/366; 428/303; 428/408; 428/903
[58] Field of Search ........................ 427/365, 366, 180;
428/297, 408, 903, 303

[56] References Cited

U.S. PATENT DOCUMENTS

| | | | |
|---|---|---|---|
| 4,061,827 | 12/1977 | Gould | 427/180 |
| 4,228,194 | 10/1980 | Meede | 428/408 |
| 4,388,370 | 6/1983 | Ellis et al. | 427/180 |
| 4,568,592 | 2/1986 | Kawaguchi et al. | 428/903 |

*Primary Examiner*—James J. Bell
*Attorney, Agent, or Firm*—Wenderoth, Lind & Ponack

[57] ABSTRACT

An electroconductive film having moderate transparency and electroconductivity and excellent mechanical properties inclusive of a good tear strength is provided through a process wherein an electroconductive fiber is dispersed over a thermoplastic resin film, and the thus formed loosely laminated sheet is hot-pressed between a pair of rollers having temperatures above and below the softening point of the thermoplastic resin film, at least one of the rollers being surfaced with an elastic material. The electroconductive film is suitably used as a packaging material for shielding electromagnetic wave.

14 Claims, 4 Drawing Figures

ELECTROCONDUCTIVE FILM AND PROCESS FOR PRODUCTION THEREOF

FIELD OF THE INVENTION AND RELATED ART

The present invention relates to an electroconductive film which is suitable as a packaging material because of a moderate transparency and electroconductivity and excellent mechanical properties such as an excellent tear strength, and a process for producing the same.

In order to obviate undesirable effects accompanying electrostatic charges generated during the course of shipment or transportation of electronic parts such as semiconductor IC and LSI, printed circuit substrates, magnetic recording tapes, etc., packed in a packaging such as a bag of a plastic film, there has been taken a measure of incorporating or mixing an electroconductive material in the plastic film. As the electroconductive material used for this purpose, electroconductive fine powder such as carbon black has been frequently used. In this case, however, the resultant film becomes not only opaque so that a content packed therein cannot be observed through the film but also poor in mechanical strengths. In order to obviate these difficulties, there have also been many proposals as to use of electroconductive fiber represented by carbon fiber in place of electroconductive fine powder to be incorporated. However, these proposals also involve many problems as will be described below.

In the case where electroconductive fiber is mixed in a molding process such as the extrusion molding which includes the steps of melt-kneading and then shaping as used for formation of ordinary plastic films, the fiber is cut in the course of melt-kneading for uniformly dispersing the fiber, whereby a desired degree of improvement in electroconductivity cannot be attained, or the same problems as involved in the mixing of electroconductive fine powder cannot be avoided. For this reason, it has been difficult to form a uniform film having a desired electroconductivity.

In contrast thereto, there is the so-called paper-making process which is a process having succeeded in formation of a uniform film with a desired electroconductivity. More specifically, the paper-making process is a process wherein carbon fiber is mixed in a dry system or in a wet system with pulp of thermoplastic resin fiber and/or natural fiber to form a web in a like manner as in the paper-making step, followed by drying and hot-pressing to obtain an electroconductive film or sheet (Japanese Patent Publication No. 27554/1973, G.B. Laid-Open Patent Application No. 1410107 (corresponding to DE-OS No. 2350158), etc.). According to the above described paper-making process, an electroconductive film or sheet having a surface or sheet resistivity (according to ASTM D257) of the order of $10^3$–$10^4$ $\Omega/\square$ (ohm per square) and having a thickness of the order of 50 to 100 $\mu$m can be manufactured without difficulty. The electroconductive film thus obtained according to the paper-making process has two problems, however, when viewed as a packaging material. The problems are a low transparency and a low mechanical strength represented by a low tear strength because of boundary surfaces of the thermoplastic resin fiber or natural fiber in the product film and also of some bubbles remaining therein. For this reason, it is difficult to see a content through the film and the film is liable to be torn at the part in contact with a projection of the content.

On the other hand, in order to obviate the difficulties accompanying the mixing of the electroconductive fiber in the melt-kneading step as encountered in the above-mentioned extrusion process, there has been proposed a process for producing a synthetic resin molding compound for shielding electromagnetic wave, wherein an electroconductive fiber is deposited in a layer on a sheet of a thermoplastic resin alone which has been once formed, e.g., by extrusion, these materials are pressure-bonded to each other at a temperature above the softening point of the thermoplastic resin, and the composite synthetic resin sheet thus obtained is cut into thin strips (Japanese Laid-Open Patent Application No. 217345/1983). The thin strip-form molding compound obtained by this process is described to be used, e.g., for forming a cabinet by injection molding, etc. This process is, however, as apparent from the object thereof, is a process for producing a molding compound and is not capable of providing an electroconductive film which can be used as a packaging material as such. More specifically, while a broad range of from 0.1 mm (100 $\mu$m) to 5 mm is disclosed as the thickness of the synthetic resin sheet to be used as the starting sheet material in this process, very thick sheets of the order of 2.5–3 mm are used in the actual examples. Further, in view of the fact that the composite synthetic resin sheet obtained in the intermediate stage is immediately thereafter cut into thin strips, it is impossible at all to consider that a film having such an integrity and a strength as to allow the film to be used as a packaging material has been produced through the above mentioned process.

SUMMARY OF THE INVENTION

A principal object of the present invention is, in view of the above circumstances, to provide an electroconductive film having a moderate tranparency and electroconductivity and being excellent in mechanical properties such as a tear strength.

Another object of the present invention is to provide a process for effectively producing such an electroconductive film.

As a result of our study with the above objects in view, it has been found that an electroconductive film excellent in transparency, mechanical strength and also integrity as a film can be obtained through a process which is at a glance similar to the steps involved in the process of the above-mentioned Japanese Laid-Open Patent Application No. 217345/1983 and in which an electroconductive fiber such as carbon fiber is dispersed over a thin thermoplastic resin sheet as thin as 20 to 200 $\mu$m and they are composited by passing them through a pair of rollers under the conditions that the pair of rollers are provided with a certain temperature relationship in connection with the softening point of the thermoplastic resin and at least one of the pair of rollers is surfaced with an elastic material.

The electroconductive film of the present invention has been provided based on the above knowledge and more specifically comprises: a film of a thermoplastic resin, and an electroconductive fiber having an average diameter of 1 to 30 $\mu$m and an average length of 1 to 60 mm embedded in and substantially uniformly distributed over the extension of the thermoplastic resin film; the electroconductive film having a thickness of 20 to 200 $\mu$m, a specific gravity equal to or larger than that of the thermoplastic resin film, a surface resistivity of $10^0$ to $10^5$ $\Omega/\square$ on at least one surface thereof, a tear strength of 10 g or larger, and a transparency of 40% or above.

Further, the process for producing an electroconductive film according to the present invention comprises: dispersing an electroconductive fiber over a thermoplastic resin film to form a loosely laminated sheet, and passing the loosely laminated sheet between a pair of hot-press rollers to form an electroconductive film wherein the electroconductive fiber is embedded in the thermoplastic resin film; one of the pair of hot-press rollers having a temperature equal to or above the softening point of the thermoplastic resin film, and the other hot-press roller having a temperature, below the softening point of the thermoplastic resin film; at least one of the pair of hot-press rollers contacting the loosely laminated sheet through an elastic material.

The operation mechanism of the present invention which provides the advantageous effects of the invention is presumed as follows. Where both of the pair of hot-press rollers are rigid rollers, i.e., rollers which are rigid inclusive of the surfaces thereof, or where both the hot-press rollers have a temperature equal to or above the softening point of the synthetic resin sheet, the severance of the embedded electroconductive fiber per se or the thermoplastic resin film at portions where the fiber is embedded occurs in the product film so that an electroconductive film susceptible of use as a packaging film, as it is, cannot be obtained. On the other hand, where both of the rollers have a temperature below the softening point of the thermoplastic resin film, the electroconductive fiber is not so sufficiently embedded that a desired electroconductive film having excellent integrity cannot be obtained again. In contrast thereto, where at least one of the pair of hot-press rollers is surfaced with an elastic material and the pair of hot-press rollers are provided with a particular relationship, i.e., temperatures striding the softening point of the thermoplastic resin film, according to the present invention, there is established such a condition that the electroconductive fiber can be embedded in the thermoplastic resin film and the severance of the thermoplastic resin or the electroconductive fiber is not caused because of, while not necessarily clear, the effect of the elastic material of absorbing a stress caused by the protrusion or unevenness of the fiber and a subtle temperature distribution established in the thermoplastic film between the rollers. This is presumed to be a reason why an electroconductive film with excellent integrity is provided according to the present invention.

These and other objects, features and advantages of the present invention will become more apparent upon a consideration of the following description of the preferred embodiments concluding with specific examples of practice of the present invention taken in conjunction with the accompanying drawings wherein like parts are denoted by like reference numerals. In the description appearing hereinafter, "%" and "parts" referring to quantity ratios are by weight, unless otherwise noted specifically.

DESCRIPTION OF THE PREFERRED EMBODIMENTS

Figure 1:
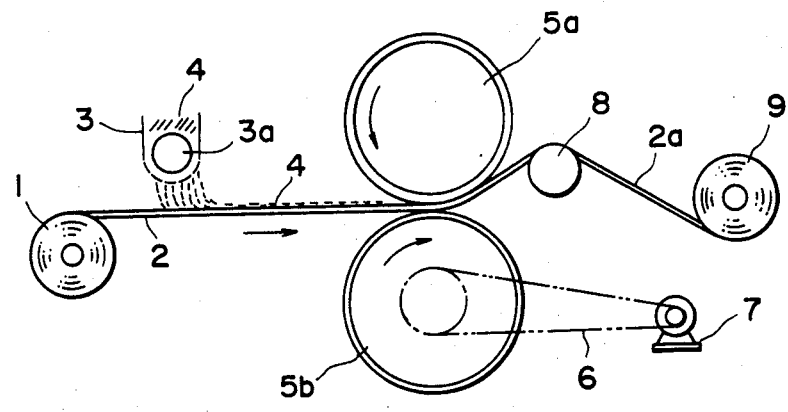
FIGS. 1 to 4 respectively illustrate a schematic arrangement of an apparatus for practicing the process for producing an electroconductive film according to the present invention.

FIG. 1 is a schematic arrangement view of an embodiment of apparatus for practicing the process for producing an electroconductive film according to the invention.

Referring to FIG. 1, a thermoplastic resin film 2 is fed at a rate of 1 to 50 m/min. while unwinding a feedstock film roll 1. As the thermoplastic resin constituting the film 2, an arbitrary resin can be used basically, as far as it is film-formable. The resin, however, is preferably a polyolefin such as low-density, medium-density or high-density polyethylene and polypropylene; ethylene-vinyl acetate copolymer, polyethylene terephthalate, polyamide, plasticized polyvinyl chloride, polyvinylidene chloride, polyvinylidene fluoride, polystyrene, polyphenylene sulphide, etc. Among these, polyethylene having a specific gravity of the order of 0.92 to 0.94 is most preferably used in view of a bag-formability inclusive of sealability, economical factor, etc. The thickness of the thermoplastic resin film 2 should preferably be in the range of 6 to 200 $\mu$m, particularly 20 to 100 $\mu$m.

Then, an electroconductive fiber 4 is dispersed on the thus fed thermoplastic resin film 2 by means of an apparatus for dispersing the electroconductive fiber comprising a rotary feeder having a rotary screw 3a or a vibrating screen (not shown). The electroconductive fiber may be a fiber of a metal such as stainless steel, aluminum or brass, or a polymer fiber coated with a metal, but preferably be carbon fiber (meant to include graphite fiber) as it is or coated with a metal. For the purpose of providing the electroconductive film according to the invention, the electroconductive fiber 4 should preferably have a diameter of approximately 1 to 30 $\mu$m and a length of approximately 1 to 60 $\mu$m. The electroconductive fiber should preferably be dispersed at a rate of approximately 0.02 to 2.0 g/m$^2$ in the case of carbon fiber. When another kind of electroconductive fiber is used, the dispersion rate should preferably be modified in accordance with the ratio of the specific gravity thereof to that of carbon fiber. Particularly, the dispersion rate is preferably such that the electroconductive fiber occupies 0.2 to 20% by volume of the product electroconductive film. The electroconductive fiber can be embedded only in a part of the thickness of the product electroconductive film. In this case, the above mentioned volume ratio should hold true with the electroconductive fiber-embedded layer of the product film.

Then, the thus formed loosely laminated sheet comprising the thermoplastic resin film 2 and the electroconductive fiber 4 dispersed thereon is passed through a pair of hot-press rollers 5a and 5b. According to the invention, at least one of the rollers 5a and 5b has a surface layer composed of an elastic material such as styrene-butadiene rubber, chloroprene rubber, silicon rubber, nitrile rubber and fluororubber. The total thickness of the elastic material layer(s) is preferably of the order of 0.5 to 30 mm, particularly 2 to 12 mm with respect to the pair of rollers. Where the elastic material layer is formed on either one of the rollers 5a and 5b, it is preferably formed on the roller 5a which directly contacts the dispersed electroconductive fiber 4.

As another characteristic feature of the invention, one of the rollers 5a and 5b has a temperature (referring to "surface temperature", the same meaning hereinafter) equal to or above the softening point of the thermoplastic resin film, and the other has a temperature below the softening point. Here, the softening point of the thermoplastic resin film is a penetration temperature measured according to ASTM-D1525-587 (JIS K6742) for an amorphous resin constituting the film, or a melting point measured by means of a differential scanning calorimeter (DSC) for a crystalline resin. It is further preferred that one of the rollers 5a and 5b has a temperature above the softening point by 10° to 160° C., particularly by 40° to 120° C. where the thermoplastic resin film 2 comprises an amorphous resin, and by 10° to 120° C., particularly 30° to 80° C. for a crystalline resin. The other roller should preferably have a temperature below the softening point by 10° to 80° C., particularly 20° to 60° C. Further, it is preferred that the average of the temperatures 5a and 5b is within the range of ±20° C. of the softening point. It may be considered preferable at a first sight that the roller 5a directly contacting the electroconductive fiber 4 has a higher temperature. As a matter of fact, however, good results are also obtained when the roller 5b on the opposite side has a higher temperature. Where only one roller is surfaced with an elastic material, it is preferred that the elastic roller is placed on the lower temperature side.

The gap or clearance between the rollers 5a and 5b are adjusted to provide a desired roller pressure by the medium of the elastic material. The roller pressure may be adjusted by passing a known pressure measuring film (e.g., one known as "PRESCALE", available from Fuji Shashin Film K.K.) between the rollers surfaced with the elastic material. The roller pressure in terms of a linear pressure thus adjusted may preferably be 1 to 20 kg.f/cm, particularly 5 to 10 kg.f/cm while it depends on the kind of the resin constituting the film.

In the embodiment shown in FIG. 1, the electroconductive fiber 4 is embedded through hot-pressing by driving the roller 5b of the pair of rollers 5a and 5b by means of a motor 7 through a belt 6. The thus obtained electroconductive film 2a according to the invention is rapidly cooled by a cooling roller 8 after having passed through the rollers 5a and 5b and then taken up about a take-up roll 9. The cooling roller 8 is not always necessary but is by far preferred to be used in order to prevent the occurrence of wrinkles of the electroconductive film 2a which can occur during gradual cooling in the absence of such a cooling roller. In other words, it should be avoided as far as possible to place the electroconductive film under no constraint while it is hot. More specifically, it is preferred to have the film contact the cooling roller 8 at a temperature below the softening point by 10° C. or more within 1 second after passing through the hot-press rollers 5a and 5b.

Figure 2:
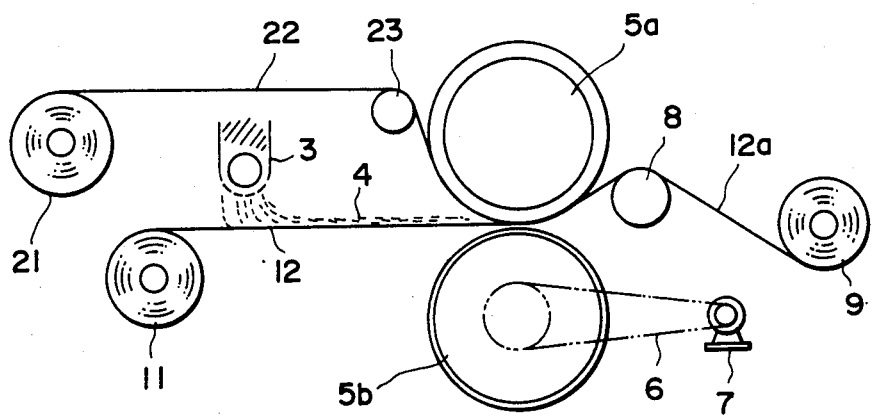

It is also preferred to use a plurality of starting thermoplastic resin films for the production of the electroconductive film according to the invention. FIG. 2 illustrates an example of such an embodiment.

In the embodiment shown in FIG. 2, a pair of thermoplastic resin films 12 and 22 each having a thickness which is almost one half the thickness of the thermoplastic resin film 2 shown in FIG. 1 are fed at substantially the same speed from the feedstock rolls 11 and 21, respectively. Electroconductive fiber 4 is dispersed on one thermoplastic resin film 12, and the other film 22 is caused to move along the roller 5a by means of a guide roller 23 and caused to sandwich the electroconductive fiber 4 with the thermoplastic resin film 12. The thus formed laminated sheet is then passed through the rollers 5a and 5b to be hot-pressed, whereby an electroconductive film 12a according to the invention is obtained. The other features are substantially the same as those described with reference to FIG. 1. In this embodiment, the falling-off of the electroconductive fiber is less liable to occur and it is possible to easily prevent the attachment of the fiber onto the elastic roller. In a case where a plurality of thermoplastic resin films are used as in this embodiment, a pair of films sandwiching the electroconductive fiber among them should preferably be composed of analogous thermoplastic resins.

Figure 3:
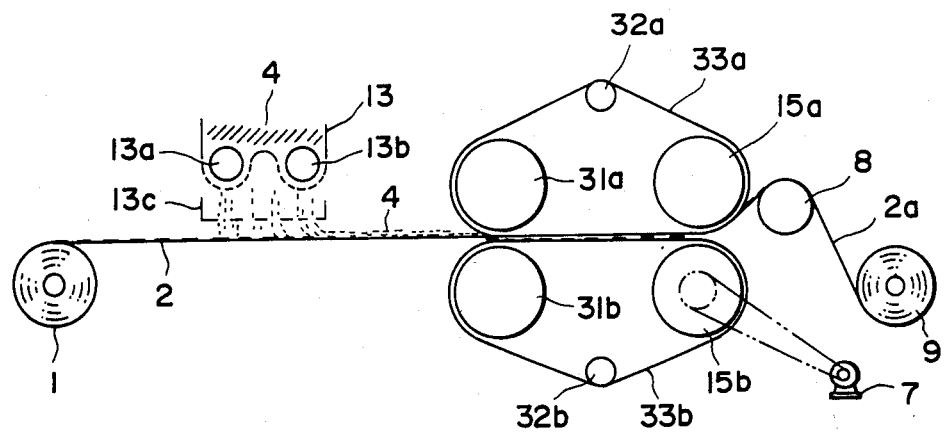

FIG. 3 illustrates an embodiment which is basically the same as the one shown in FIG. 1 but in which endless belts and pre-heating rollers are used.

Referring to FIG. 3, an electroconductive fiber 4 is dispersed on a thermoplastic resin film in a very stable manner by means of an electroconductive fiber feeding apparatus comprising dual rotary screws 13a and 13b at the bottom and a vibrating screen disposed thereunder to form a loosely laminated sheet. On the other hand, an endless belt 33a is operatively supported around a preheating roller 31a, a hot-press roller 15a and a tension roller 32a, and an endless belt 33b is operatively supported around a preheating roller 32b, a hot-press roller 15b and a tension roller 32b. The loosely laminated sheet comprising the thermoplastic resin film 2 and the fiber 4 dispersed thereon is passed between the endless belts 33a and 33b, during which the laminated sheet is preheated between the preheating rollers 31a and 31b heated to a temperature which is lower than the softening point of the thermoplastic resin film 2 by 80° to 10° C. and the electroconductive fiber is embedded while being passed between the hot-press rollers 15a and 15b. Thus, an electroconductive film 2a according to the invention is obtained. In this embodiment, both of the hot-rollers 15a and 15b may be rigid, whereas at least one of the endless belts 33a and 33b comprises an elastic material and the other may comprise a steel belt having a good heat conductivity. The elastic endless belt may of course be reinforced by embedding steel wires or by lining with a steel belt. The temperatures of the hot-rollers 15a and 15b are adjusted to establish the specified temperature relationship according to the invention.

The embodiment of FIG. 3 provides, in addition to the above mentioned stable dispersion of the electroconductive fiber through the use of the fiber dispersion apparatus 13, a more stable hot-press condition due to the use of the pre-heating rollers 31a and 31b and the endless belts 33a and 33b than in a case where the loosely laminated sheet is immediately hot-pressed between the hot-press rollers 15a and 15b, whereby the quality of the electroconductive film thus obtained is stabilized accordingly.

Figure 4:
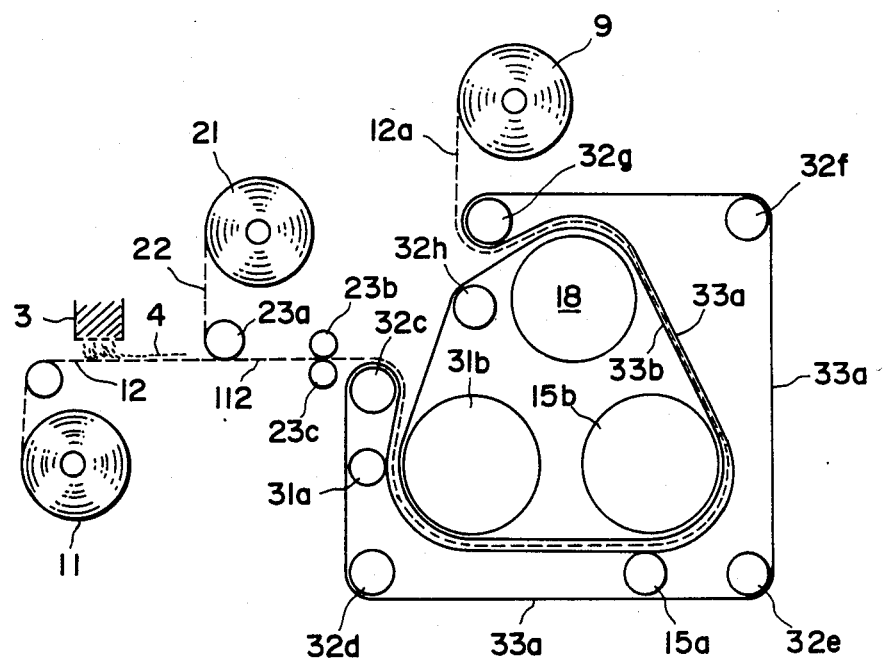

FIG. 4 shows another embodiment wherein a plurality of starting films are used as in the embodiment of FIG. 2, and pre-heating rollers and endless belts are additionally used.

Referring to FIG. 4, an outer endless belt 33a is operatively supported around tension rollers 32c, 32d, 32e, 32f and 32g, a preheating roller 31a and a hot-press roller 15a. On the other hand, an inner endless belt 33b is operatively supported around a preheating roller 31b, a hot-press roller 15b, a cooling roller 18 and a tension roller 32b. Thermoplastic resin films 12 and 22 supplied from feed-stock rolls 11 and 21, respectively, are cuased to sandwich an electroconductive fiber 4 dispersed on the film 32 when passed through a guide roller 23a to form a loosely laminated sheet 112, which is then passed between guide rollers 23b and 23c and passed between the above mentioned pair of endless belts 33a and 33b, during which the laminated sheet 112 is preheated between preheating rollers 31a and 31b, hot-pressed between hot-press rollers 15a and 15b and cooled by contacting a cooling roller 18 to provide an electroconductive film 12 accoring to the present invention.

The embodiment of FIG. 4, when compared with that of FIG. 2, provides the advantageous effects accompanying the use of preheating rollers and endless belts explained with reference to FIG. 3, and also realize effective heating and cooling of the sheet 112 through the use of the preheating roller 31b, the hot-press roller 15 and the cooling roller 18 which have relatively large diameters and, therefore, large contact areas with the sheet 112 and are disposed inside the inner endless belt 33. The embodiment of FIG. 4 also provides an advantage of effectively preventing the occurrence of wrinkles, because the film after the hot-pressing is immediately cooled while it is under constraint.

Further, in order to prevent the occurrence of wrinkles in the product film as described above, it is also effective that the film having passed between the hot-press rollers is passed between an additional pair of hot-press rollers similar to the above except that they have a reversed temperature relationship with respect to the surfaces of the film, while this embodiment is not particularly shown in the drawings. Alternatively, the above described temperature relationships given by consecutive pairs of hot-press rollers may be realized by utilizing the combination of the preheating rollers 31a and 31b with the hot-press rollers 15a and 15b.

The electroconductive film according to the present invention produced through the process as described above is characterized by the features of: a thickness of 20 to 200 $\mu$m, particularly 50 to 80 $\mu$m; a specific gravity equal to or larger than that of the starting material thermoplastic resin film, more specifically 0.91 to 0.96, particularly 0.92 to 0.94 when the thermoplastic resin film comprises polyethylene; a surface resistivity of $10^0$ to $10^5$ $\Omega/\square$ (ohm per square), particularly $10^0$ to $10^3$ $\Omega/\square$; a tear strength of 10 g or above, particularly 30 g or above; and a transparency of 40% or above, particularly 50% or above. In an ordinary case, the electroconductive film is obtained as a film having the physical properties: a volume resistivity of $10^1$ to $10^7$ $\Omega$.cm, particularly $10^1$ to $10^4$ $\Omega$.cm; a tensile strength of 0.5 to 5.0 kg/mm$^2$, particularly 0.7 to 5.0 kg/mm$^2$; and a tensile elongation of 5 to 50%.

The parameters as described above are based on the values measured according to the following standards:

Thickness: measured by a dial gauge (accuracy: 1/1000 mm).

Transparency: ASTM D-1000 (measured by a digital haze meter).

Surface or sheet resistivity: ASTM D-257 (measured by THP #16008).

Volume resistivity: ibid.

Tensile strength: JIS K6732 (measured by Tensilon).

Tensile elongation: ibid.

Tear strength: JIS P8116 (measured by Elemendorf tearing tester).

The electroconductive film thus obtained according to the invention generally has a heat-sealability while it somewhat depends on the kind of the thermoplastic resin film used, and is therefore readily formed into a packaging material in the form of a bag or may be used also as a film for surface lamination, so that it is particularly useful as a packaging material for which prevention of electrostaticity is desired.

As described above, according to the present invention, there is provided an electroconductive film suitable as a packaging material having moderate transparency, electroconductivity and mechanical properties represented by a tear strength, particularly through a process wherein a thermoplastic resin film on which an electroconductive fiber has been dispersed is hot-pressed between a pair of rollers which satisfy a specific temperature relationship and comprise a specific surface material.

Hereinbelow, the present invention will be described with reference to specific examples of practice.

EXAMPLE 1

An electroconductive film was produced by using an apparatus substantially the same as shown in FIG. 1. A low-density polyethylene film (softening point: 105° C.) of 40 $\mu$ in thickness was used as a thermoplastic resin film 2 and fed at a rate of 10 m/min. Carbon fiber having a diameter of 12 $\mu$m and a length of 3 mm was dispersed at a rate of 0.18 g/m$^2$ on the polyethylene film and passed together between hot-press rollers 5a and 5b adjusted to exert a linear pressure of 10 kg.f/cm. The roller 5a had a surface layer of 10 mm-thick silicone rubber and the surface temperature thereof was adjusted to 80° C. On the other hand, the roller 5b was coated with a surface layer of 50 $\mu$m-thick Teflon (Trade name of polytetrafluoroethylene (TFE) mfd. by DuPont Chem. Co. Ltd.) and the surface temperature was set to 160° C. The film having passed through the rollers 5a and 5b was cooled by a cooling roller 8 having a surface temperature of 25° C. and disposed 80 mm downstream from the rollers 5a and 5b to product an electroconductive film which was then wrapped around a roll 9.

EXAMPLE 2

An electroconductive film was produced by using an apparatus substantially the same as shown in FIG. 2. The thermoplastic resin films 12 and 22 respectively comprised a 30 $\mu$m-thick low-density polyethylene film and were fed at a rate of 8 m/min. Between the films, carbon fiber having a diameter of 12 $\mu$m and a length of 6 mm was dispersed and sandwiched at a rate of 0.18 g/m$^2$, and the resultant loosely laminated sheet was passed through a pair of hot-press rollers 5a and 5b adjusted to exert a linear pressure of 12 kg.f/cm. The roller 5a had a 4 mm-thick surface silicon layer and the surface temperature thereof was set to 90° C. The roller 5b had a 30 $\mu$m-thick surface Teflon layer and the surface temperature was set to 170° C. The film having passed through the rollers 5a and 5b was cooled by a cooling roller 8 having a surface temperature of 20° C. and disposed 80 mm downstream to obtain an electroconductive film, which was then wrapped around a roll 9.

The measured parameters of the thus produced electroconductive films in Examples 1 and 2 are listed along with those of a commercially available electroconductive film as a comparative example (Trade name: KUREPALM S103, mfd. by Kureha Kagaku Kogyo K.K.) which was obtained through the paper making process by mixing substantially the same carbon fiber with polyethylene fiber in substantially the same proportion.

TABLE

| Item | Unit | Example 1 | Example 2 | Comparative Example |
| --- | --- | --- | --- | --- |
| Thickness | μm | 36 | 55 | 57 |
| Carbon fiber content | % | 3 | 3 | 3 |
| Surface resistivity | Ω | $10^3$ | $10^3$ | $10^4$ |
| Volume resistivity | Ω·cm | $10^4$ | $10^4$ | $10^6$ |
| Tear strength | g | >90 | >90 | 20 |
| Transparency | % | 78 | 74 | 45 |
| Moisture permeability | g/m²/24 hr* | 15 | 12 | 40 |
| Tensile elongation | % | 20 | 15 | 7 |

*Measured according to JIS Z0208 (cup method)

As apparent in view of the results shown in the above table, the electroconductive film according to the invention are not only superior in transparency and mechanical strengths represented by a tear strength but also superior in electroconductivity as represented by a small surface resistivity and a small volume resistivity. This is presumably because a better contacting state between individual carbon fibers with less intermediate polyethylene is produced during the carbon fiber embedding stage through hot pressing when compared with that obtained in the paper-making process.

What is claimed is:

1. An electroconductive film, comprising: a film of a thermoplastic resin, and an electroconductive fiber having an average diameter of 1 to 30 μm and an average length of 1 to 60 mm embedded in and substantially uniformly distributed over the extension of the thermoplastic resin film; said electroconductive film having a thickness of 20 to 200 μm, a specific gravity equal to or larger than that of the thermoplastic resin film, a surface resistivity of $10^0$ to $10^5$ Ω/□ on at least one surface thereof, a tear strength of 10 g or larger, and a transparency of 40% or above.

2. The electroconductive film according to claim 1, wherein the electroconductive fiber comprises carbon fiber.

3. The electroconductive film according to claim 1, wherein said thermoplastic resin film comprises polyethylene.

4. The electroconductive film according to claim 3, which further has a specific gravity of 0.91 to 0.96, a volume resistivity of $10^1$ to $10^7$ Ω.cm, a tensile strength of 0.5 to 5.0 kg/mm² and a tensile elongation of 5 to 50%.

5. The electroconductive film according to claim 1, which contain 0.2 to 20% by volume of the electroconductive fiber with respect to the electroconductive fiber-embedded layer.

6. A process for producing an electroconductive film, comprising:

dispersing an electroconductive fiber over a thermoplastic resin film to form a loosely laminated sheet, and passing the loosely laminated sheet between a pair of hot-press rollers to form an electroconductive film wherein the electroconductive fiber is embedded in the thermoplastic resin film; one of said pair of hot-press rollers having a temperature equal to or above the softening point of the thermoplastic resin film, the other hot-press roller having a temperature below the softening temperature of the thermoplastic resin film and at least one of said pair of hot-press rollers contacting the loosely laminated sheet through an elastic material.

7. The process according to claim 6, wherein said thermoplastic resin film comprises an amorphous resin, one of the pair of hot-press rollers has a temperature above the softening point of the thermoplastic resin film by 10° to 160° C., and the other hot-press roller has a temperature below the softening point by 10° to 80° C.

8. The process according to claim 6, wherein said thermoplastic resin film comprises a crystalline resin, one of the pair of hot-press rollers has a temperature above the softening point of the thermoplastic resin film by 10° to 120° C., and the other hot-press roller has a temperature below the softening point by 10° to 80° C.

9. The process according to claim 6, wherein an additional thermoplastic resin film is disposed over the electroconductive fiber dispersed so that the electroconductive fiber is sandwiched between the thermoplastic resin films to form a loosely laminated sheet, and the loosely laminated sheet is passed through said pair of hot-press rollers.

10. The process according to claim 6, wherein the electroconductive film formed by passing through said pair of hot-press rollers is further passed through an additional pair of hot-press rollers having a temperature relationship opposite to the one that holds true with said pair of hot-press rollers with respect to the film.

11. The process according to claim 6, wherein the electroconductive film having passed through the hot-press rollers is caused to contact a cooling roller.

12. The process according to claim 6, wherein said elastic material forms an endless belt operatively supported abut said at least one of hot-press rollers.

13. The process according to claim 6, wherein said loosely laminated sheet is passed through a pair of pre-heating rollers prior to being passed through said pair of hot press-rollers.

14. The process according to claim 13, wherein one endless belt is operatively supported about one of said pair of pre-heating rollers and one of said pair of hot-press rollers, another endless belt is operatively supported about the other pre-heating roller and the other hot press roller, said loosely laminate sheet is passed between the thus formed pair of endless belts, and at least one of the pair of endless belts comprises an elastic material.

* * * * *